United States Patent
Deibert

(10) Patent No.: US 7,854,089 B2
(45) Date of Patent: Dec. 21, 2010

(54) MULTIPLE-USE VERMIN ELECTROCUTION TRAP AND METHOD

(75) Inventor: Ronald Henry Deibert, Calgary (CA)

(73) Assignee: Animal Deterrent Systems, Ltd., Alberta (CA)

( * ) Notice: Subject to any disclaimer, the term of this patent is extended or adjusted under 35 U.S.C. 154(b) by 45 days.

(21) Appl. No.: 12/103,536

(22) Filed: Apr. 15, 2008

(65) Prior Publication Data

US 2009/0223112 A1 Sep. 10, 2009

(30) Foreign Application Priority Data

Mar. 5, 2008 (CA) .................................. 2621101

(51) Int. Cl.
*A01M 1/22* (2006.01)
*A01M 19/00* (2006.01)
*A01M 23/38* (2006.01)

(52) U.S. Cl. ...................... 43/99; 43/71; 43/74; 43/98

(58) Field of Classification Search ............... 43/71–72, 43/74, 98–99
See application file for complete search history.

(56) References Cited

U.S. PATENT DOCUMENTS

| | | | |
|---|---|---|---|
| 1,045,676 A | 11/1912 | Clifford | |
| 1,047,682 A | 12/1912 | Morawski | |
| 1,110,186 A | 9/1914 | Carmichael | |
| 1,115,695 A | 11/1914 | Leyson | |
| 1,727,666 A | 9/1929 | Nicks et al. | |
| 2,110,678 A | 3/1938 | Robbins | |
| 2,360,651 A * | 10/1944 | Crumrine | 43/99 |
| 2,515,947 A * | 7/1950 | Crumrine | 43/77 |
| 3,815,278 A * | 6/1974 | Beaton et al. | 43/99 |
| 4,062,142 A | 12/1977 | Marotti | |
| 5,205,064 A | 4/1993 | Nolen | |
| 5,369,907 A | 12/1994 | Lee | |
| 5,471,781 A | 12/1995 | Vine | |
| 5,519,962 A | 5/1996 | Cerullo | |
| 5,720,126 A | 2/1998 | Lamb | |
| 5,878,526 A | 3/1999 | Brigalia, Sr. et al. | |
| 6,016,623 A | 1/2000 | Celestine | |
| 6,088,948 A | 7/2000 | Rønnau | |
| 2006/0032110 A1 | 2/2006 | Yang | |
| 2006/0123693 A1 | 6/2006 | Muller et al. | |

(Continued)

FOREIGN PATENT DOCUMENTS

CA 2 544 563 4/2006

(Continued)

OTHER PUBLICATIONS

Office Action, CA 2,621,101, dated Dec. 1, 2008.

(Continued)

*Primary Examiner*—David J Parsley
(74) *Attorney, Agent, or Firm*—Haynes and Boone, LLP

(57) ABSTRACT

A vermin trap including a movable path between the trap entrance and the bait, and a sensor adjacent the movable path for detecting vermin presence on the path. When a vermin detection signal is sent to a controller, the controller causes a movable clamping member to trap the vermin for electrocution. Also provided are methods for the path to rotate and/or pivot, thereby dislodging the electrocuted vermin into a containment region. Methods for electrocuting vermin are also disclosed.

22 Claims, 6 Drawing Sheets

U.S. PATENT DOCUMENTS

2007/0245617 A1    10/2007    Deibert

FOREIGN PATENT DOCUMENTS

WO    WO 2005/122756    12/2005

OTHER PUBLICATIONS

Office Action—Restriction/Election Requirement, U.S. Appl. No. 11/407,961, dated Mar. 20, 2009.
Response to Official Action, CA 2,621,101, dated Mar. 31, 2009.
Response to Restriction Requirement, U.S. Appl. No. 11/407,961, dated Apr. 21, 2009.
Office Action, U.S. Appl. No. 11/407,961, dated Jul. 11, 2009.

* cited by examiner

MULTIPLE-USE VERMIN ELECTROCUTION TRAP AND METHOD

FIELD OF THE INVENTION

The present invention relates to animal traps, and more particularly to electric vermin traps.

BACKGROUND OF THE INVENTION

Native to central Asia, mice arrived in North America with settlers from Europe and other points. Rats arrived in similar fashion. The rodents spread across North America and are now found in every province and territory in Canada, and every state in the United States. This includes all major population areas.

Mice are considered among the most troublesome and economically damaging rodents in North America. Rats are also a very serious problem, but because the general population does not usually come into regular contact with rats, rats are not perceived to be as significant a problem as mice. However, both mice and rats are very adaptable and able to live in close association with humans; as such, both are termed "commensal" rodents. Mice are much more common in residences and structures than other common rodents, including shrews, voles and squirrels. The focus is on rodents including mice and rats for purposes of the present application, but the present invention is equally relevant and applicable to other pests, including, without limitation birds and other pests. The term "vermin" is often used herein, and is used in a non-limiting sense, being merely representative of the great variety of rodents and other pests that someone of ordinary skill in the art would easily recognize as being proper targets of the trap and method taught herein.

Mice live in and around homes, farms, commercial establishments, in open fields and meadows. With the onset of cold weather each fall, mice move into structures in search of shelter and food. Mice can survive with little or no free water, although they will readily drink if water is available. They can obtain all the water they need from the food they eat. An absence of free water, or food with low moisture content in their environment, may reduce their breeding potential.

Mice have poor eyesight, relying on their hearing and highly developed senses of smell, taste, and touch. Mice breed year round, but when living outdoors, they usually breed in spring and fall. A female may have five to ten litters of four to eight young per year, and the gestation period is 18 to 21 days. A female is sexually mature at six to eight weeks of age. Mouse populations can, therefore, increase rapidly under good conditions, and the average mouse lives one to two years.

Rodents can transmit various diseases to humans, including salmonellosis (food poisoning), rickettsialpox, and lymphocytic choriomeningitis. Mice may carry leptospirosis, rat bite fever, tapeworms, and organisms that may cause ringworm (a fungal disease of the skin) in humans. As well, mice may carry hantavirus pulmonary syndrome ("Hantavirus"), which can be lethal to humans. In addition, rodents can chew through protective covering on wires causing major damage in commercial and industrial complexes. Accordingly, rodents should not be tolerated around schools, restaurants, food storage areas, warehouses, office buildings, dwellings or other areas where humans may come into contact with rodents or the organisms they carry. The Food and Agricultural Organization of the United Nations reported that between one-fifth and one-third of the world's total food supply never reaches the table due to losses from rodents.

Damage, to insulation inside walls and attics, quickly occurs when mice reach large populations in dwellings and commercial buildings. They may gnaw electrical wiring and create fire hazards or other malfunctions that are expensive to repair.

Various control methods are currently employed, with varying degrees of effectiveness. Poison baits are commonly employed, but they should never be used when there may be children or other animals present. Further, this method also suffers from the fact that mice usually return to their nest in an inaccessible location prior to death. Even if they do not return to their nest, mice perishing within walls or other inaccessible places within a dwelling or commercial building can cause secondary infestations of damaging insects that feed and breed upon the carcasses. Mice will also hoard or carry food to other locations; such hoarding of food is common, and it may result in amounts of poison bait being moved to places where it goes undetected and may be hazardous to non-target species. Non-toxic methods of rodent control are more effective and considerably more sanitary since rodents captured by these methods can be disposed of properly.

Trapping is one alternative method of controlling mice, but it requires labour, time and handling of any captured mice. One advantage is that it eliminates the problem of odours from decomposing carcasses and secondary infestations that may occur when poisoning is used. It also has the advantage of not relying on inherently hazardous rodenticides, it permits the user to view his or her success, and it allows for easier disposal of the mice. However, the success rate for traps varies widely and the method still requires the physical handling of mice, with all the inherent dangers of the diseases mentioned above being transmitted to humans—and particularly Hantavirus.

So-called "snap traps" are simple and inexpensive; however, the quality and effectiveness varies widely. Some poorly made snap traps will often break when they are triggered, are ineffective due to flaws, or are not sensitive enough to catch small or cautious mice.

An alternative to snap traps are glue boards, which catch mice by means of a pressure sensitive adhesive. When mice attempt to cross the glue board, they get stuck, much the same way that flypaper catches flies. A significant drawback to glue boards is that the mouse is not killed (but will die from starvation and dehydration if not attended) and must be killed and then disposed of. Because the mouse is not killed, many jurisdictions have banned glue boards.

Box traps work on the principle that mice readily enter small holes. The traps then hold the mice by means of one-way doors. More than one mouse may be caught by these traps, but because the mice are only caught and not killed, someone needs to check the traps frequently and release the captured mice. Of course, they will need to be released some distance from the dwelling or commercial building or they will simply re-enter. And, again, all the hazards are present of the mice transmitting the various diseases to the persons handling the trap.

Several styles of electrocution traps have become available in recent years. Most are powered by batteries and produce death to rodents by delivering a high volt-low amperage jolt. These traps potentially offer a quick, easy and less messy means of removing rodents when compared to either snap traps or glue boards. However, their reliability varies greatly and there are reports that some rodents are capable of escaping lethal encounters with some models. All of them presently require someone to physically handle the dead rodents to dispose of them. Again, the possibility of disease being transmitted from the dead rodents is present.

What is needed, therefore, is a trap that is simple and effective, attracting vermin and providing for safe handling of the dead catch.

SUMMARY OF THE INVENTION

The present invention accordingly seeks to provide a trap and trapping method that is applicable to a number of rodent and pest types, for example, but not limited to rats, mice and the like. Further, the present invention seeks to provide a trap and method which is simple, effective, and safe to use.

Traps according to the present invention are electrocution traps. The present invention seeks to overcome and eliminate perceived inadequacies of traps currently on the market, as well as one significant deficiency in all traps—the need for human handling of a dead rodent. In addition, the preferred electrocution embodiment of the present invention has been specifically designed to seek to eliminate the possibility of a rodent being able to avoid electrocution. Further, when utilizing bait having a scent, the use of a small fan in an optional embodiment is thought to help ensure the bait odour is more widely dispersed than simply relying on existing air currents, therefore improving the success ratio. Finally, where the rodent is electrocuted, it preferably drops into a disposal or containment chamber in which a liner (which may be a simple plastic bag) is placed; all that would then be required is for a drawer to be pulled out, and, as the drawer is being pulled out, the top of the liner can simply be folded over and closed, thereby sealing in the dead rodent, ready for immediate disposal.

According to a first aspect of the present invention there is provided a vermin trap apparatus including:
a housing;
ingress means in the housing to enable vermin access to housing interior;
bait retention means at a location in the housing interior spaced from the ingress means, the bait retention means for receiving bait, the bait for attracting the vermin;
movable path means between the ingress means and the bait retention means, the movable path means capable of rotatable, pivotable, or translational movement, or a combination thereof, from a first vermin supporting position, to a second vermin discarding position;
a clamping member movable from a first position to a second vermin engaging position, the clamping member including one or more areas wired for passage of electric current;
a containment region disposed below the movable path means;
sensor means adjacent the path means for detecting vermin presence on the path means and sending a vermin detection signal to control means upon detecting vermin presence; and
the control means for actuating movement of the clamping member from a first position to a second vermin engaging position in response to receiving the vermin detection signal, the vermin engaging position holding the vermin for passage of electric current, the control means subsequently promoting movement of the path means from the vermin engaging position to the vermin discarding position, said movement of the path means including pivotal, rotational or translational movement, or a combination thereof, thereby dislodging the vermin and dropping the vermin into the containment region.

In a further embodiment of the present invention, there is provided a trap apparatus as described above, further including a second clamping member wired for passage of electric current when the vermin is in contact therewith.

In a further embodiment, there is provided a trap apparatus as described above, wherein the path means includes a hinged floor pivotable from a first vermin supporting position to a second vermin discarding position.

The present invention also provides a trap apparatus as described above, wherein the hinged floor is wired for selective electrification.

Also provided by the present invention is the trap apparatus as defined above, wherein the ingress means includes an aperture in the housing communicating with a tubular path, the tubular path leading to the movable path means.

The present invention also provides a trap apparatus as described above further including a fan adjacent the bait retention means, for propelling bait scent toward the ingress means.

The present invention also contemplates a trap apparatus as described above wherein the bait retention means is separated from the movable path means by a vented partition.

Also provided by the present invention is the trap apparatus as described above further including a removable liner within the containment region, for receiving vermin carcasses after electrocution and enabling disposal of the vermin carcasses.

The present invention also provides a trap apparatus, wherein the containment region includes a removable drawer.

Also provided by the present invention, the trap apparatus as described above may further include a reservoir for holding disinfectant, a pump for forcing disinfectant from the reservoir through a nozzle in the housing of the apparatus and spraying the disinfectant onto at least one surface or component in the apparatus that has been in contact with vermin. Further, the electrocuted vermin may be sprayed with disinfectant. In an embodiment of the present invention, which is not meant to be limiting in any manner, the disinfectant may be volatile, for example, alcohol-based or the like, to allow for quick evaporation from surfaces or components as compared to water-based or oil-based disinfectants.

The trap apparatus as described herein also contemplates that the sensor for detecting the vermin may include an infra-red motion sensor. However, other sensors as would be know to those of ordinary skill in the art based on the guidance provided herein may be employed.

The present invention also contemplates a trap apparatus as described above, wherein in the vermin engaging position, the vermin is restrained between the clamping member and a wall, floor, component or protrusion extending therefrom that is wired for the passage of electric current. It is also contemplated that the wall, floor, component, or protrusion therefrom includes a second clamping member, the member optionally being movable.

Also provided by the present invention is a vermin trap apparatus including:
a housing;
ingress means in the housing to enable vermin access to the housing interior;
bait retention means at a location in the housing interior spaced from the ingress means, the bait retention means for receiving bait, the bait for attracting the vermin;
movable path means between the ingress means and the bait retention means, the movable path means providing rotatable, pivotable, or translational movement, or a combination thereof, from a first vermin supporting position, to a second vermin discarding position;
a first clamping member including one or more areas wired for passage of electric current, the first clamping member movable from a first position to a second vermin engaging position, the second position holding the vermin between the first clamping member and a second clamping member, the second clamping member also including one or more areas wired for passage of electrical current such that current may pass from the first clamping member through the vermin to the second clamping member, or vice versa;

a containment region disposed below the movable path means;

sensor means for detecting vermin presence on the path means and sending a vermin detection signal to control means upon detecting vermin presence; and the control means for actuating movement of the first clamping member from the first position to the second vermin engaging position in response to receiving the vermin detection signal, the vermin engaging position holding the vermin still for passage of electric current, a control means subsequently promoting movement of the path means, thereby dislodging the electrocuted vermin and dropping the vermin into the containment region.

The present invention also includes a method for entrapping vermin including the steps of:
a. attracting the vermin to a trap using bait within the trap;
b. allowing the vermin to enter the trap;
c. providing movable path means within the trap;
d. allowing the vermin to proceed onto the movable path means;
e. sensing the vermin presence using sensor means;
f. sending a vermin detection signal from the sensor means to control means upon sensing the vermin presence;
g. sending a signal from the control means to a clamping member to actuate movement of the clamping member from a first vermin non-engaging position to a second vermin engaging position,
h. transmitting electric current through the clamping member to electrocute vermin; and
i. releasing the electrocuted vermin;
j. moving the path means to dislodge the vermin and dropping said vermin into a containment region within the trap.

The present invention also contemplates a trap apparatus or method as described above wherein the vermin is a rodent, for example, but not limited to a mouse or rat. In a more specific embodiment, the vermin is a mouse. In an alternate embodiment, the vermin is a rat. In another embodiment, the vermin is a bird.

A detailed description of exemplary embodiments of the present invention are given in the following. It is to be understood, however, that the invention is not to be construed as limited to these embodiments.

BRIEF DESCRIPTION OF THE DRAWINGS

In the accompanying drawings, which illustrate an exemplary embodiment of the present invention.

DETAILED DESCRIPTION OF AN EXEMPLARY EMBODIMENT

Figure 1:
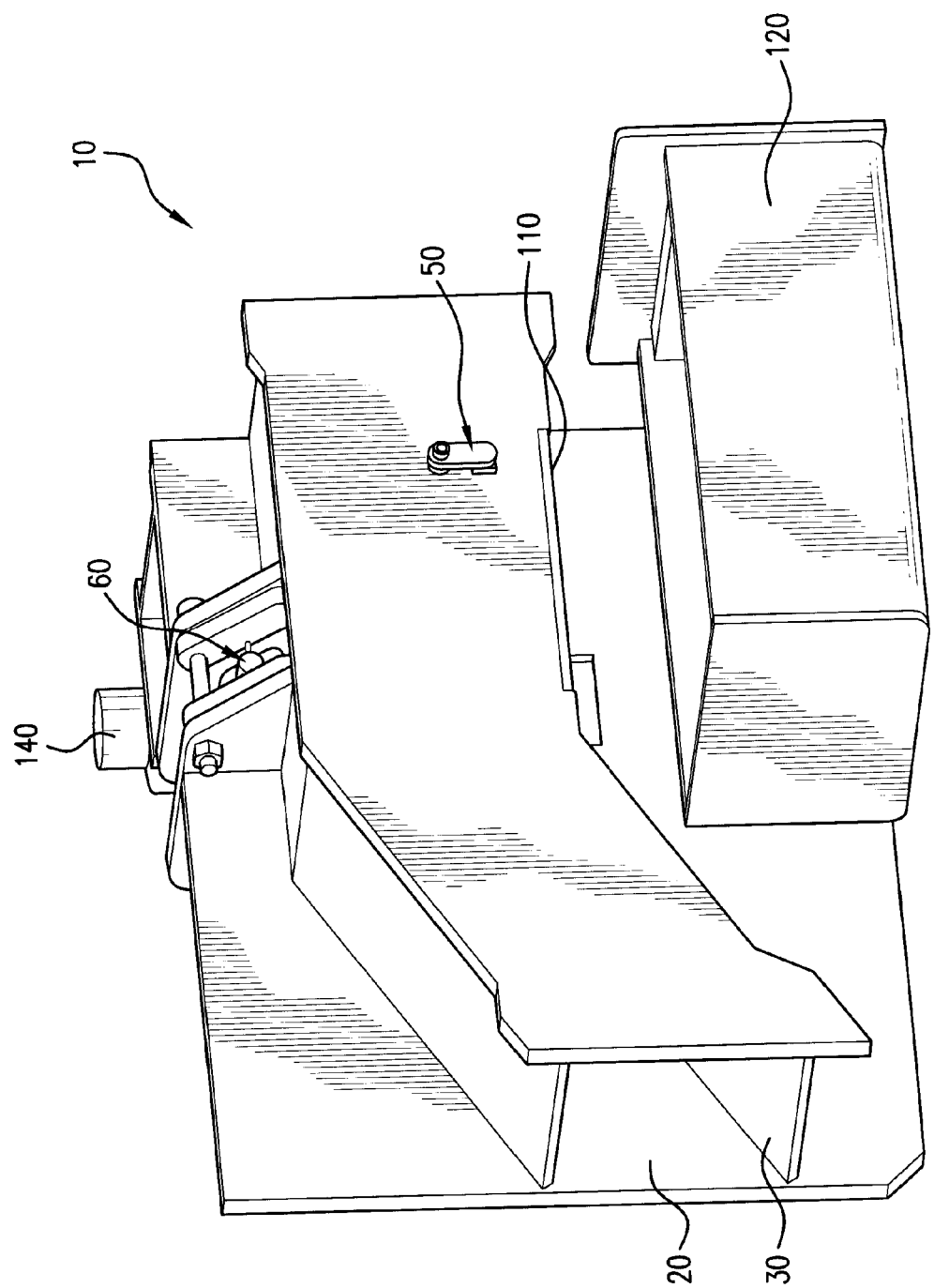
FIG. 1 is a partial internal view of the trap apparatus depicting various aspects of an exemplary embodiment of the present invention.
Figure 2:
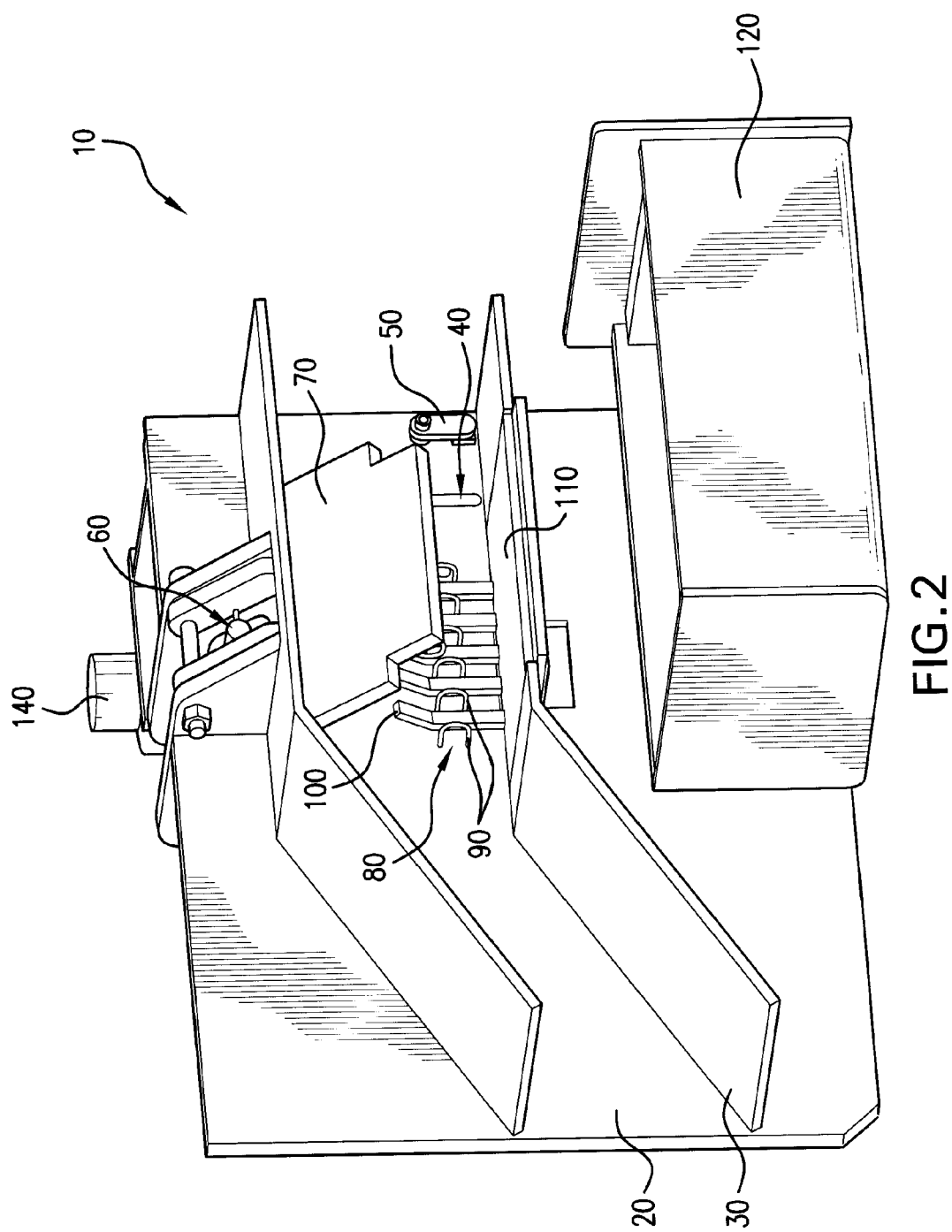
FIG. 2 is a partial internal view of the trap apparatus depicting various aspects of an exemplary embodiment of the present invention.
Figure 3:
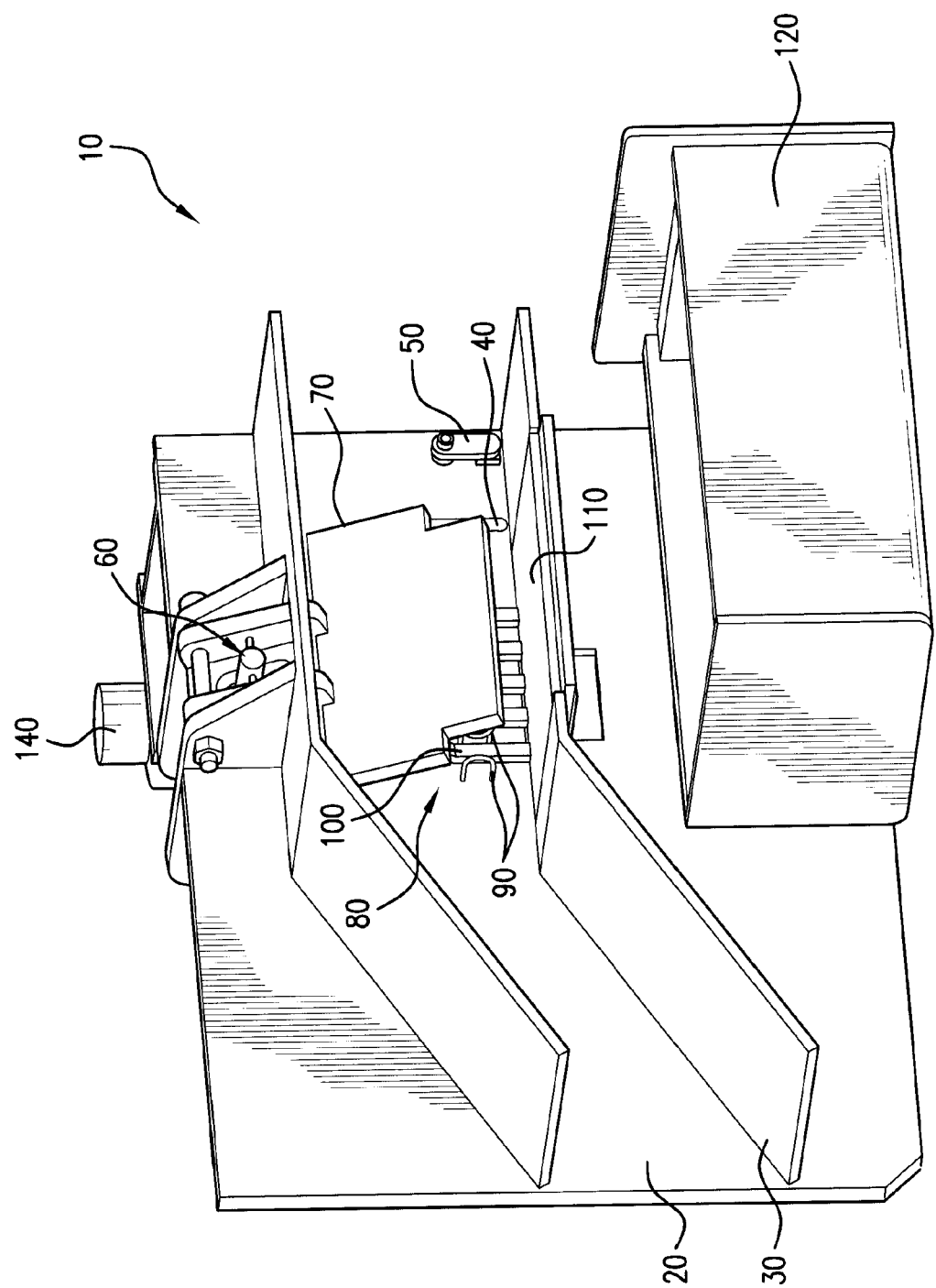
FIG. 3 is a partial internal view of the trap apparatus depicting various aspects of an exemplary embodiment of the present invention.
Figure 4:
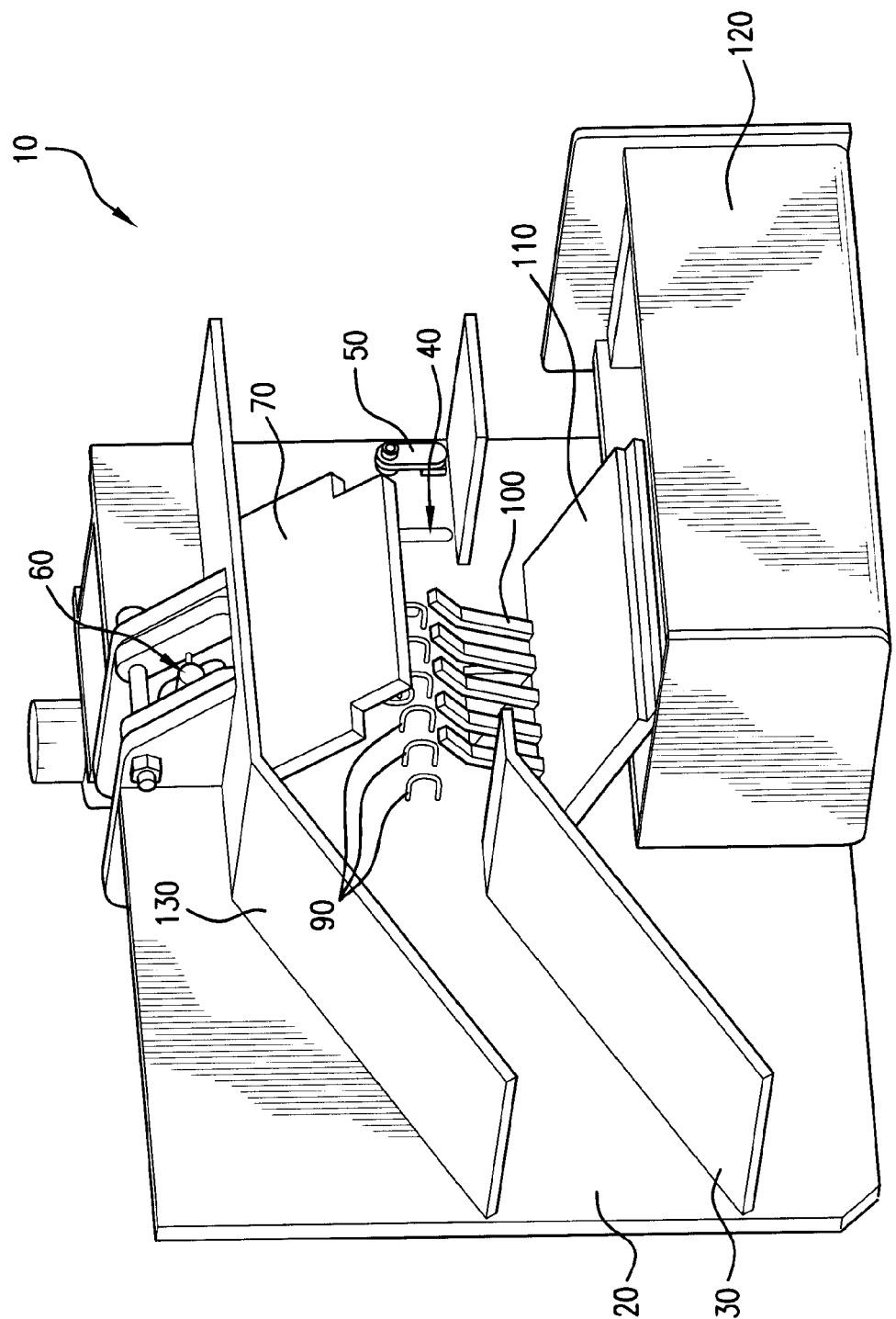
FIG. 4 is a partial internal view of the trap apparatus depicting various aspects of an exemplary embodiment of the present invention.
Figure 5:
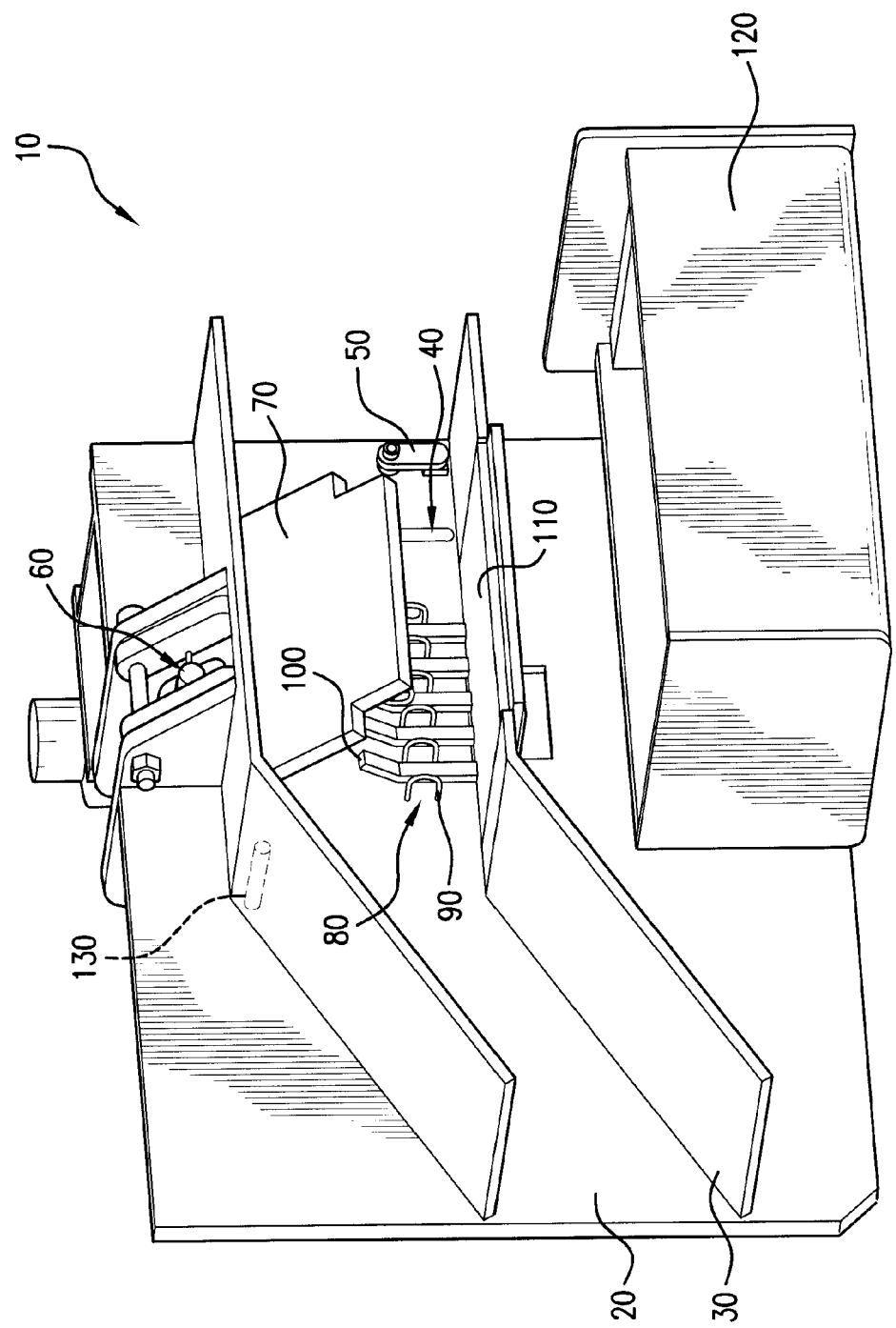
FIG. 5 is a partial internal view of the trap apparatus depicting various aspects of an exemplary embodiment of the present invention.

According to the present invention there can be provided a vermin trap apparatus including:
a housing;
ingress means in the housing to enable vermin access to the housing interior;
bait retention means at a location in the housing interior spaced from the ingress means, the bait retention means for receiving bait, the bait for attracting the vermin;
movable path means between the ingress means and the bait retention means, the movable path means capable of rotatable, pivotable, or translational movement, or a combination thereof, from a first vermin supporting position, to a second vermin discarding position;
a clamping member movable from a first position to a second vermin engaging position; the clamping member including one or more areas wired for passage of electric current;
a containment region disposed below the movable path means;
sensor means for detecting vermin presence on the path means and sending a vermin detection signal to a control means upon detecting vermin presence; and
the control means for actuating movement of the clamping member from a first position to a second vermin engaging position in response to receiving the vermin detection signal, the vermin engaging position holding the vermin still for passage of electric current therethrough, the control means subsequently promoting movement of the path means, thereby dislodging the electrocuted vermin and dropping the vermin into the containment region.

In the embodiment described above, it is preferred that the control means releases or actuates movement of the clamping member back to first position after a predetermined time.

In a further embodiment of the present invention, which is not meant to be limiting in any manner, there can be provided a vermin trap apparatus including:
a housing;
ingress means in the housing to enable vermin access to the housing interior;
bait retention means at a location in the housing interior spaced from the ingress means, the bait retention means for receiving bait, the bait for attracting the vermin;
movable path means between the ingress means and the bait retention means;
a first clamping member including one or more areas wired for passage of electric current, the first clamping member movable from a first position to a second vermin engaging position, the second position holding the vermin between the first clamping member and a second clamping member, the second clamping member also including one or more areas wired for passage of electrical current such that current may pass from the first clamping member through the vermin to the second clamping member, or vice versa;
a containment region disposed below the movable path means;

sensor means for detecting vermin presence on the path means and sending a vermin detection signal to control means upon detecting vermin presence; and the control means for actuating first movement of the first clamping member from the first position to the second vermin engaging position in response to receiving the vermin detection signal, the vermin engaging position holding the vermin still for passage of electric current, a control means subsequently promoting movement of the path means, thereby dislodging the electrocuted vermin and dropping the vermin into the containment region.

The terms "clamping member" or "clamping members" are used herein to denote any surface, region, component, protrusion of the trap apparatus, or any combination thereof that may assist in restraining the vermin for electrocution. It is contemplated that the trap apparatus may include a first movable clamping member that is capable of movement from a non-vermin engaging position to a vermin engaging position wherein the vermin is restrained for electrocution. In a further embodiment of the present invention, but not wishing to be considered limiting in any manner, the trap apparatus including first clamping member, second clamping member or both may include plates or the like having one or more electrical contacts therein or protruding therefrom. In such an embodiment, it is also contemplated that the first clamping member is capable of pivotal movement, rotational movement, or a combination thereof and the second clamping member includes a wall, floor or other surface or part thereof inside the vermin trap apparatus. For example, but not to be considered limiting in any manner, the first clamping member may pivot about an axis to trap vermin between it and the second clamping member which has one or more electrical contacts therein or protruding therefrom and which forms part of the adjacent wall. In an alternate embodiment, the second clamping member may include part of the path means. For example, but not to be considered limiting in any manner, the first clamping member may pivot to hold the vermin against the path means. Current may then pass through vermin being held between the first clamping member and the second clamping member which is a part of the path means in this particular embodiment.

In a further embodiment of the present invention, but without wishing to be considered limiting, the movable path means may include a flat hinged floor that is wired to be selectively electrified, and for pivotal and/or rotational movement from a rodent supporting position to a rodent discarding position. In such an embodiment, a rodent or the like walks onto the flat, hinged floor where it is sensed by a sensor, for example, but not limited to an infrared movement sensor or the like, activating movement of at least one clamping member to a rodent engaging position and electrocuting the rodent. Following electrocution, a signal is sent from a control means to cause the floor to pivot from a rodent supporting position to a rodent discarding position causing the electrocuted rodent to fall into the containment chamber in which a plastic bag has been placed.

In the embodiments described above, it is preferred that the vermin is electrocuted on or over the movable path means to permit dislodging and dropping of the electrocuted vermin into the containment region. Other variations as could be determined by a person of ordinary skill in the art based on the guidance provided herein are also contemplated herein.

It is also contemplated that the trap apparatus as described herein may include a rake or the like to assist in dislodging the vermin carcass from the path means. For example, but not to be considered limiting in any manner, the movable path means may include a portion having a plurality of members extending therefrom forming a rake on one side of the path means. Movement, for example, rotational movement, translational movement, pivoting, or a combination thereof, of the path means may be used to transmit a translational or rotational force to the carcass of the electrocuted vermin to facilitate dislodging and discarding thereof into the containment region.

It is also contemplated that the path mean may be connected directly or indirectly to a lever arm or the like, which itself is capable of rotational, translational or pivoting movement thereby causing a similar action in the path means, specifically, movement from a vermin supporting position to a vermin discarding position and vice versa.

In an embodiment of the present invention, but not wishing to be limiting in any manner, the apparatus may be configured such that electrical current flows to the clamping member or members only when member or members are in a vermin engaging position, and have secured vermin. In the disengaged position, wherein no vermin is secured by the one or more clamping members, preferably no current is capable of flowing to the clamping member or members.

In general, the bait held in the bait retention means is not accessible to the vermin that enters the trap apparatus. The bait retention means preferably includes a surface, platform, tray or the like in a partially enclosed or vented compartment that communicates with the movable path means. Accordingly, vermin may follow the scent of bait into the trap apparatus, for example, through an entrance, opening or other ingress means, optionally up a ramp and through one or more tunnels within the apparatus to the movable path means in an attempt to reach bait retained in a vented compartment. Once the vermin is on the movable path means, a sensor signals a controller to activate a clamping member which secures the vermin on or over the path means for electrocution.

The present invention also contemplates that the bait retention means may further include a fan, or the like to disperse the scent of the bait over the path means and optionally outside the opening of the trap apparatus. In such an embodiment, the scent of the bait may be dispersed over a greater area than if no fan is used. Further, a fan may assist in dispersing the scent of certain types of bait which are less odorous than other types of bait. However, it is to be clear that the use of a fan is optional as testing has indicated that the traps work well without a fan.

In a preferred embodiment of the present invention, the trap apparatus also includes a disinfectant which may be sprayed to disinfect areas and/or components in the apparatus after electrocution of the vermin. For example, a disinfectant may be stored in a reservoir contained in the apparatus, and delivered via a spray nozzle to one or more areas and/or components of the trap apparatus, for example, but not limited to the rotating or pivoting path means, the clamp member or members, rake, the electrocuted vermin, rodent containment drawer, or any combination thereof.

As will be understood by a person of ordinary skill in the art, the outlet or nozzle for spraying the disinfectant may be located as various positions within the trap apparatus, for example, beside, adjacent, above or any combination thereof in relation to the first clamping member, second clamping member or both, the path means or any other location as would be understood by a person of ordinary skill in the art.

In an embodiment of the present invention, which is not meant to be limiting in any manner, the disinfectant is sprayed simultaneously with or after the activation of the movable path means resulting in pivotal, rotational movement and/or translational movement and the dumping of the vermin carcass into the containment region. In a further embodiment, which is not meant to be limiting in any manner, the repositioning of the movable path means after the carcass is disposed resets all systems within the trap apparatus until next activation. In the embodiments described above, it is to be understood that the vermin is not sprayed prior to or during passage of current as this could lead to arcing, or non lethal electrocution of the vermin, which is not preferred.

It is also contemplated the electrocution time and/or current characteristics, for example voltage, amperage and the like may be adjusted as needed to ensure efficient electrocution of different types of vermin. In an embodiment, which is not meant to be limiting in any manner, vermin can be held for about 1 second to about 30 seconds, about 2 seconds to about 20 seconds, or about 3 seconds to about 12 seconds during electrocution, before being disposed of as described herein. In one preferred embodiment, the vermin can be held for about 6 seconds.

Referring now to FIGS. 1-5, there are shown partial internal views depicting aspects of the vermin trap apparatus, which are not meant to be limiting in any manner. Vermin trap apparatus (10) includes ingress means (20) for entry of vermin. The vermin travels up ramp (30) following scent of bait that optionally may be blown by fan through air vent (40). As vermin approaches air vent (40), it is detected by a sensor (50), for example, by breaking an infrared beam or the like which in turn signals a solenoid (60) to activate movement of the first clamping member (70) to a vermin engaging position. In the embodiments shown, the vermin is restrained between movable first clamping member (70) and a portion of the adjacent wall (i.e. second clamping member (80)) including a plurality of electrical contacts (90) extruding therefrom. Current flows through the restrained vermin via the first clamping member (70) and the second clamping member (80) for a time suitable for electrocution of the vermin.

In the embodiments shown, but without wishing to be considered limiting in any manner, the second clamping member includes part of a wall or other surface in the trap apparatus, and further includes one or more electrical contacts therein or protruding therefrom. In an alternate embodiment, the second clamping member may be capable of movement similar to the first member, for example, but not limited to rotational, pivotal and/or translational movement. In still a further non-limiting embodiment, the first and second clamping members may be substantially similar or identical to each other. Further, one or both may be capable of movement to engage and restrain vermin for electrocution.

As shown by FIGS. 1-5, rake extension members (100) may be disposed between the electrical contacts (90) protruding from the second clamping member (80), the rake extension members (100) extending upwardly, about perpendicular from the horizontal, movable path means (110).

At the end of the current flow cycle, a second solenoid activates the movable path means (110) from a vermin supporting position to a vermin discarding position and the carcass is dislodged into the containment region (120). Concurrently with and/or immediately after this action, a pump is activated to deliver a short burst of disinfectant stored in a reservoir (140) via spray nozzle (130) to disinfect the area in which the vermin is electrocuted. When the movable path means (110) returns to a vermin supporting position, the vermin trap apparatus is reset and is ready for the next activation.

In an embodiment which employs an optional fan, air is drawn through vents which are provided in a removable access door on the housing of the trap apparatus. Air flows over the odorous bait and is forced through the tunnel (as the trap apparatus is enclosed) and out the opening to attract the target vermin. Without wishing to be bound by theory or limiting in any manner, optional fan ensures that the scent of the bait is transmitted over a larger area than if only the usual air currents were relied upon. However, rodents and pests are attracted to the opening by the smell of the bait regardless of whether a fan is employed.

Figure 6:
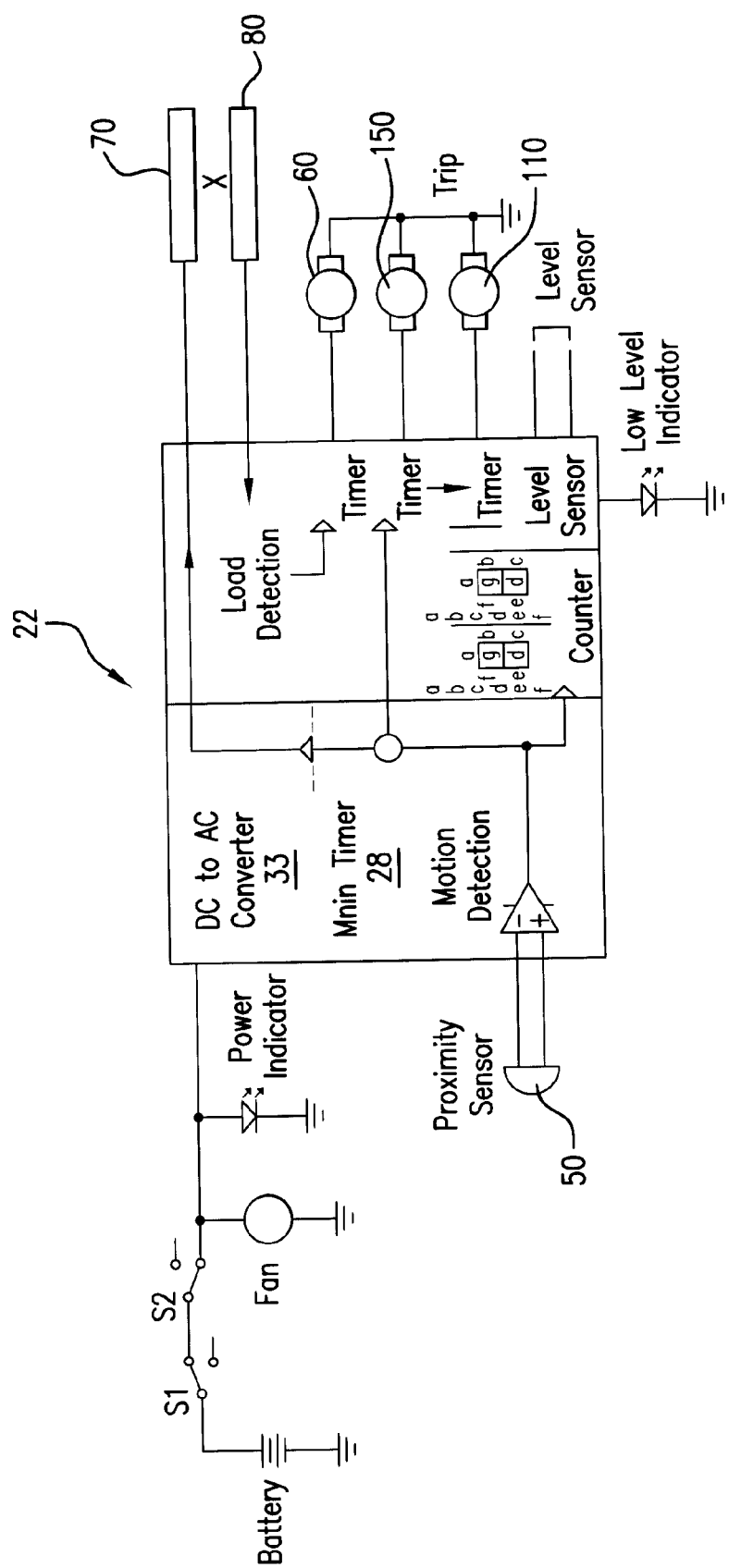
FIG. 6 is a partial, simplified schematic illustrating the control electronics of the trap apparatus.

In a preferred embodiment, but without limitation, the trap is powered by a battery and switches can control feed of power to the optional fan. Referring now to FIG. 6, control electronics (22) may be housed in an electronics housing, which mates with the trap apparatus housing or elsewhere. The sensor (50) sends a signal which initiates a series of actions within the trap apparatus. The signal is sent to the control electronics (22), which are illustrated in simplified form. A main timer (28) and associated timers may control a staged series of events. First, the timer (28) allows for power to flow through a DC to AC converter (33), as can be seen in FIG. 6, which activates solenoid (60) and subsequent electrifying of clamping member (70) or members (70,80) for electrocution of the vermin in the trap. The activation can be pre-set to remain active for a set period of time sufficient in the judgment of an ordinary-skilled person for electrocution purposes based on the guidance provided herein.

At the same time, or immediately after activation of the clamping member or members, the timer (28) enables power to flow and activate a pump (150) for a pre-set duration to produce a burst of spray (not shown) from spray nozzle (130), preferably from the side and slightly behind the rodent. The spray liquid is stored in a reservoir (140), and it is a disinfectant. Immediately after the spray, timer (28) activates second solenoid (not shown) which pivots movable path mean (110) and the rake (100) assists in forcing the carcass into containment region (120).

An access door is also preferably provided with a limit switch, which can disable the power to the trap when the access door is opened to allow for disposal of the rodent carcasses. The reservoir is also preferably provided with level sensing means, including a level sensor and low-level indicator. The trap apparatus may also include an indicator to show when electrocution of vermin has occurred. Further, there also may be provided a indicator to show if the containment drawer is full.

Because the rodent and/or pest is sprayed with disinfectant, the health risk to humans is significantly reduced. Further, because humans do not need to directly come in contact with the dead rodent and/or pest, the health risk is further reduced.

The term "about," as used herein, should generally be understood to refer to both numbers in a range of numerals. Moreover, all numerical ranges herein should be understood to include each whole integer within the range.

While particular embodiments of the invention have been described in the foregoing, it is to be understood that other embodiments are possible within the scope of the invention and are intended to be included herein. It will be clear to any person of ordinary skill in the art that modifications of and adjustments to this invention, not shown, are possible without departing from the spirit of the invention as demonstrated through the exemplary embodiment. The invention is therefore to be considered limited solely by the scope of the appended claims.

What is claimed is:

1. A vermin electrocution trap apparatus comprising:
 a housing containing an interior space, the interior space comprising a confined path, the path comprising at least one pivotal floor section pivotable between a vermin supporting position and a vermin discarding position;
 ingress means in the housing to enable vermin access to the path;

bait retention means adapted to receive bait, the bait retention means disposed at a location in the housing interior spaced from the ingress means, to attract the vermin to proceed along the path to the at least one pivotable floor section;

a first clamping member movable from a vermin non-engaging position to a vermin engaging position, adjacent the at least one pivotable floor section, the first clamping member comprising one or more areas wired for passage of electrical current;

a carcass disposal region disposed below the at least one pivotable floor section; and sensor means adjacent the at least one pivotable floor section and adapted to detect vermin presence and sending a vermin detection signal to a control means upon detecting vermin presence;

the control means adapted to actuate movement of the first clamping member from the vermin non-engaging position to the vermin engaging position in response to receiving the vermin detection signal, the vermin engaging position securing the vermin in place so that electrical current is passed through the vermin to kill the vermin, the control means subsequently actuating movement of the first clamping member from the vermin engaging position to the vermin non-engaging position and providing downward pivoting of the at least one pivotable floor section from the vermin supporting position to the vermin discarding position thereby dropping the vermin into the carcass disposal region.

2. The trap apparatus as defined in claim 1, further comprising a second clamping member comprising one or more areas wired for passage of electrical current such that current may from the first clamping member through the vermin to the second clamping member, or vice versa.

3. The apparatus of claim 1, wherein the at least one pivotable floor section is wired for selective electrification.

4. The apparatus of claim 1 wherein the ingress means comprises an aperture in the housing and the path comprises a tubular path, the aperture communicating with the tubular path, the tubular path leading to the at least one pivotable floor section.

5. The apparatus of claim 1 further comprising a fan adjacent the bait retention means, to propel bait scent toward the ingress means.

6. The apparatus of claim 1 wherein the bait retention means is separated from the at least one pivotable floor section.

7. The apparatus of claim 1 farther comprising a removable liner within the carcass disposal region that is adapted to receive, vermin carcasses after electrocution and enabling disposal of the vermin carcasses.

8. The apparatus of claim 1, wherein the carcass disposal region comprises an openable door to enable removal of vermin carcasses.

9. The apparatus of claim 1, adapted to spray electrocuted vermin with the disinfectant.

10. The apparatus of claim 1, wherein the sensor means comprises an infrared motion sensor.

11. The apparatus of claim 1, wherein when the first clamping member is in the vermin engaging position, the vermin is secured in place between the first clamping member and a member of the group selected from a wall, a floor, a component and a protrusion extending therefrom, wired for the passage of electrical current such that current may pass from the first clamping member through the vermin to the member of the group selected from a wall, a floor, a component and a protrusion extending therefrom, or vice versa.

12. The apparatus of claim 11, wherein the member of the group selected from a wall, a floor, a component, and a protrusion extending therefrom comprises a second clamping member.

13. The vermin trap apparatus of claim 1, wherein the vermin is a rodent.

14. The apparatus of claim 1, further comprising a reservoir adapted to hold disinfectant, a pump adapted to force disinfectant from the reservoir and spraying the disinfectant onto at least one surface or component located within the interior space that has been in contact with vermin after disposing of the vermin.

15. The apparatus of claim 5, wherein a fan is disposed within the partition and adapted to propel bait scent toward the ingress means.

16. The apparatus of claim 12, wherein the second clamping member is movable.

17. The apparatus of claim 16, wherein the second clamping member is at least one protrusion extending generally upwardly from the at least one pivotable floor section.

18. The apparatus of claim 1, wherein the at least one pivotable floor section is provided with at least one protrusion extending generally upwardly therefrom and adjacent a pivot point of the at least one pivotable floor section, such that the at least one protrusion aids in discarding the vermin when the at least one pivotable floor section pivots toward the vermin discarding position.

19. The apparatus of claim 18, wherein the at least one protrusion on the at least one pivotable floor section is wired such that electrical current is adapted to pass through the vermin between the first clamping member and the at least one protrusion.

20. A vermin electrocution trap apparatus comprising:

a housing containing an interior space, the interior space comprising a confined path, the path comprising at least one pivotable floor section pivotable between a vermin supporting position and a vermin discarding position;

ingress means in the housing to enable vermin access to the path;

bait retention means adapted to receive bait, the bait retention means at a location in the housing interior spaced from the ingress mean to attract the vermin to proceed to along the path to the at least one pivotable floor section;

a first clamping member adjacent the at least one pivotable floor section comprising one or more areas wired for passage of electrical current, the first clamping member movable from a vermin non-engaging position to a vermin engaging position, the vermin engaging position securing the vermin in place between the first clamping member and a second clamping member, the second clamping member also comprising one or more areas wired for passage of electrical current such that current may pass from the first clamping member through the vermin to the second clamping member, or vice versa;

a carcass disposal region disposed below the at least one pivotable floor section;

sensor means adapted to detect vermin presence on the at least one pivotable floor section and sending a vermin detection signal to control means upon detecting vermin presence; and the control means adapted to actuate movement of the first clamping member from the vermin non-engaging position to the vermin engaging position in response to receiving the vermin detection signal, the vermin engaging position securing the vermin in place so that electrical current is passed through the vermin to kill the vermin, the control means subsequently actuating movement of the first clamping member from the vermin engaging position to the vermin non-engaging position and providing downward pivoting of the at least one pivotable floor section from the vermin supporting position to the vermin discarding position, thereby dropping the vermin into the carcass disposal region.

21. An vermin electrocution trap apparatus comprising:

a housing containing an interior space, the interior space comprising a confined path which comprises at least one pivotable floor section pivotable between a vermin supporting position and a vermin discarding position;

an ingress in the housing sized and dimensioned to permit vermin access to the path;

a bait retention member adapted to receive bait, the bait retention member disposed at a location in the housing interior spaced from the ingress to attract the vermin to proceed along the path to the at least one pivotable floor section;

a first clamping member adjacent the at least one pivotable floor section, movable from a vermin non-engaging position to a vermin engaging position, which first clamping member comprises one or more areas wired to pass electrical current;

a carcass disposal region disposed below the at least one pivotable floor section;

a sensor adjacent the at least one pivotable floor section and adapted to detect vermin presence and sending a vermin detection signal to a control device upon detecting vermin presence; and the control device adapted to actuate movement of the first clamping member from the vermin non-engaging position to the vermin engaging position in response to receiving the vermin detection signal, wherein the vermin engaging position secures the vermin in place so that electrical current is passed through the vermin to kill the vermin, such that the control device subsequently actuates movement of the first clamping member from the vermin engaging position to the vermin non-engaging position and provides downward pivoting of the at least one pivotable floor section from the vermin supporting position to the vermin discarding position, thereby dropping the vermin into the carcass disposal region.

22. A method for entrapping and electrocuting vermin comprising:
  a. attracting the vermin to the trap apparatus of claim 1 using bait within the trap;
  b. allowing the vermin to enter the trap upon a path;
  c. providing at least one pivotable floor section within the path;
  d. allowing the vermin to proceed onto the at least one pivotable floor section;
  e. sensing the vermin presence using sensor means;
  f. sending a vermin detection signal from the sensor means to control means upon sensing the vermin presence;
  g. sending a signal from the control means to a clamping member to actuate movement of the clamping member from a vermin non-engaging position to a vermin engaging position thereby securing the vermin in place;
  h. transmitting electrical current through the clamping member to electrocute the vermin;
  i. releasing the electrocuted vermin by sending a signal from the control means to the clamping member to actuate movement of the clamping member from the vermin engaging position to the vermin non-engaging position; and
  j. pivoting the at least one pivotable floor section downwardly to drop the electrocuted vermin into a carcass disposal region within the trap.

* * * * *

UNITED STATES PATENT AND TRADEMARK OFFICE
CERTIFICATE OF CORRECTION

| | | |
|---|---|---|
| PATENT NO. | : 7,854,089 B2 | |
| APPLICATION NO. | : 12/103536 | |
| DATED | : December 21, 2010 | |
| INVENTOR(S) | : Ronald Henry Deibert | |

It is certified that error appears in the above-identified patent and that said Letters Patent is hereby corrected as shown below:

Column 10, line 64: Please change --pivotal-- to "pivotable."

Column 11, line 33: Please insert --pass-- before "from."

Column 11, line 48: Please change --farther-- to "further."

Column 12, line 42: Please change --mean-- to "means."

Column 12, line 42: Please delete "to" after "proceed."

Column 13, line 7: Please change --An-- to "A."

Signed and Sealed this
Fifteenth Day of March, 2011

David J. Kappos
*Director of the United States Patent and Trademark Office*